Figure 1:
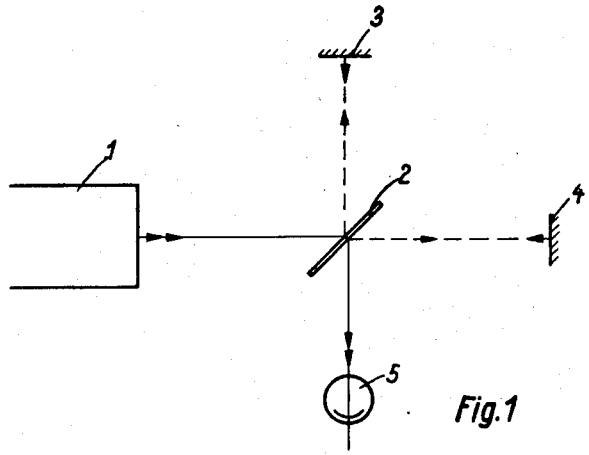

Sept. 2, 1958  H. PLESSE ET AL  2,849,912
OPTICAL ARRANGEMENT FOR DETERMINING THE RATIO
OF TWO LIGHT FLUXES
Filed Nov. 21, 1955

United States Patent Office 2,849,912
Patented Sept. 2, 1958

2,849,912

OPTICAL ARRANGEMENT FOR DETERMINING THE RATIO OF TWO LIGHT FLUXES

Hans Plesse and Heinz Franke, Heidenheim (Brenz), Germany, assignors to Carl Zeiss, Heidenheim (Brenz), Wurttemberg, Germany Application November 21, 1955, Serial No. 554,117

Claims priority, application Germany November 20, 1954

3 Claims. (Cl. 88—14)

In photometrical measurements of the spectral transmission or reflection factors of materials it is required to compare the transmission or reflection factor of the material to be examined with the transmission or reflection factor of a comparison standard. For measurements of the transmission factors of liquids e. g. the comparison standard is most often the pure solvent of the liquid to be examined.

A measuring procedure for such purposes according to the so-called direct deflection method belongs to prior art; in this two cells, of which one contains the solution to be measured and the other the comparison or standard solution, are consecutively placed into the raypath of a source of radiation emitting a monochromatic pencil of rays. In this method the sensitivity of the radiation receptor (photo-electric cell) for each spectral range corresponding to the comparison solution must be repeatedly adjusted by regulating the intensity of the source of spectral radiation (monochromator). Also of prior art is a method called the double beam method, in which a beam of rays emerging from the monochromator is split by a beam-splitting device either geometrically or physically into two partial bundles of rays. One of these part-bundles passes through the measuring cell, the other through the comparison cell. Thereafter both part-bundles are either brought together upon a receptor common to both (photo-electric cell plus amplifier) and the intensities of the rays are compared, or each of the part-bundles is made to impinge on a separate receptor and the electric currents produced by these are compared.

In arrangements of the kind described the following disadvantages occur: When applying one receptor only the sensitivity of the cathode layer of the photo-electric cell differs for both part-bundles differs strongly in dependence on the spectral colour composition of each part-bundle as a consequence of the varying direction of incidence even where the area impinged upon is common to both and of equal size. On using two separate receptors there is also a difference in the sensitivity of the two photo-electric cells for the portions of the spectrum of the two part-bundles. In devices which operate with an optical beam-splitting device such as e. g. a thin sputtered-on layer, the intensity ratio of the two part-bundles differs in consequence of the spectral dependence of the parts of the radiation reflected at or transmitted by such layers.

For the elimination of the measuring errors dependent on colour and caused by the disadvantages mentioned, the ratio of the radiant fluxes in the two part-beams must be adjusted separately for each colour by a correcting device regulated by hand, or in recording instruments with automatic operation it must be kept to a constant value by means of a considerable array of optical means, or else the error must be compensated for by a correspondingly large outlay of electronic means.

According to the present invention in optical arrangements for the determination of the ratio of two light fluxes, especially in spectrophotometers for measuring the transmission factor or reflection factor of substances by means of one measuring ray path and one comparison ray path and of one common receptor (photo-electric cell), a physical division of the rays of a monochromatic pencil of rays emitted by a radiant source into two part-bundles of rays (a measuring and a comparison bundle of rays) is performed, wherein one auto-collimating device is provided in each of the two ray paths and also means for the varying modulation of each part-bundle.

According to this basic idea in one embodiment of the invention of an optical arrangement for the measurement of the spectral transmission curve of absorbing substances, especially of liquids, the substance to be examined is arranged in the measuring ray path between one side of a beam-splitting plate producing the physical division of the rays and a mirror working in conjunction with it, and a comparison substance which may be required in certain cases, of a transmission factor comparable with the transmission factor of the substance to be measured is arranged in the comparison ray path between the other side of the beam-splitting plate and a mirror equal to the first-mentioned mirror with respect to reflection and absorption of the pencil of rays.

In a similar manner according to the invention an optical arrangement may be constructed for the measurement of the reflection factors of substances in which the substance to be examined is arranged in place of the mirror provided in the ray path intended for measuring the spectral transmission factors, while in the place of the mirror provided there in the comparison ray path a substance is arranged with a reflection factor comparable to the reflection factor of the substance to be measured.

Optical equipment designed according to the invention on the principles mentioned above, may contain for the purpose of the physical division of the rays, according to a further idea of the invention, a thin plate of a material transparent for the radiation used, which shows symmetrical structure, if necessary by the application of reflection-increasing layers, so that its reflection factor for the radiation concerned is the same on both sides of the plate. Furthermore it is also possible to use a thin plate coated on one side only with a layer increasing its reflection factor wherein however both the plate and the layer are free from absorption for the radiation concerned. It is further possible to arrange several plates at small separation from each other instead of a single plate. Furthermore, it is understood that so-called multiple layers can be applied in order to increase the reflection factor.

In order to separate the part-bundles again, after their reunion and in order to determine the part to be measured, it is required according to the invention to have separate modulation of the two part beams which can be carried out in a simple manner by arranging one interrupting device each for the rays between the mirror placed in the measuring ray path and the substance to be examined and between the mirror placed in the comparison ray path and the comparison substance.

It is essential for the arrangements according to the invention that each of the two part-bundles should come under the influence of the beam-splitting plate twice consecutively, i. e. once coming and once going, and more particularly once by reflection and once by transmission, as can be seen from the attached illustrations.

Figure 2:
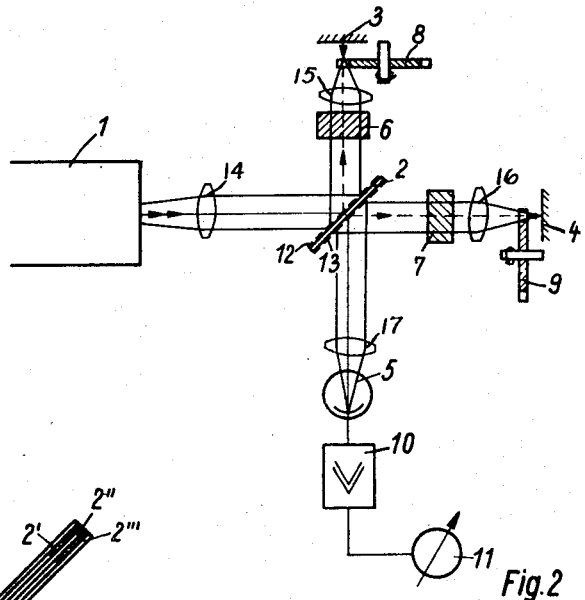

Of these illustrations,

Fig. 1 shows the basic design of an optical arrangement according to the present invention, while in Fig. 2 an arrangement is shown for measuring the transmission of absorbing substances.

The arrangement according to Fig. 1 may serve simultaneously as an embodiment of an arrangement for measuring the reflection of substances.

Figure 3:
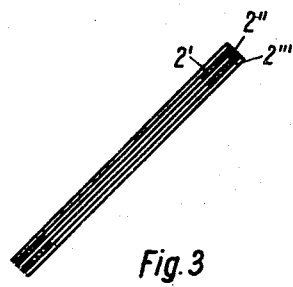

Fig. 3 shows one specific embodiment of the beam-splitting device.

In the illustrations there is designated by 1 a monochromatic light source, 2 is an optical beam-splitting device, 3 and 4 are one mirror each and 5 is a photo-electric cell. The beam-splitting device 2 consists of a thin uncoated glass or quartz plate. By its action the beam issuing from the light source 1 is divided in two part-bundles of rays which are returned towards the beam-splitting device by the respective mirrors through which they either pass again or by which they are reflected so that they impinge together upon the photo-electric cell. The beam-splitting device consists in the simplest case, as represented in Fig. 1 and 2, of a simple thin plate of glass or of quartz.

Such an uncoated plate is independent of its two surfaces as far as its transmission and reflection factors are concerned, within the whole of the visible range. Consequently the resulting intensities of the two partial light fluxes have always the same ratio of 1:1, independently of the colour of the light.

If now, as shown in Fig. 2, one cell each 6 and 7 is placed into the two part-bundles of rays made parallel by a lens 14, then each of these cells is passed twice by the corresponding part-bundle. The cell 6 in the measuring ray path contains the liquid whose transmission is to be measured while the cell 7 contains a comparison liquid. From the double passage it results that the effective layer thickness is increased by a factor of 2 compared with the previous method of single passage. This means however in practice that in the arrangement according to the invention for the measurement of the same transmission factors only half the layer thickness and consequently only half the amount of liquid is required compared with the previous methods, which is an advantage particularly for clinical investigations. By applying the principle of autocollimation by means of lenses 15, 16 and 17, in the back focal planes of which are located the mirrors 3, 4 and the photo-electric cell 5 respectively, the direction of incidence of the rays onto the beam-splitting device 2 is made equal and onto the photo-electric cell 2 is the same for both the recombined partial beams.

By placing one rotating interruptor disk 8 and 9 before each of the two mirrors 3 and 4 an interruption of the two part-bundles is produced which renders ineffective the light inevitably reflected at the cell surfaces. An amplifier 10 placed after the common receptor i. e. after the photo-electric cell 5, and tuned for the frequency of the interruptor device, eliminates the direct current component arising from the constant reflections at the cell surface, so that only the alternating current component at the interruptor frequency reaches the measuring instrument 11 to be measured. Two layers 12 and 13 are applied to the plate 2 of Fig. 3 in order to increase the reflection factor. These layers may be omitted on one side or on both. Important are merely the symmetrical reflection factors.

Fig. 3 shows a further development of the beam splitting device in so far that instead of a single plate 2 a number of uncoated glass or quartz plates 2', 2" and 2'" are arranged behind each other. In this way the light yield can be considerably increased since in view of the fact that the reflection factor for an uncoated glass surface amounts to 10% and its transmission factor to 90%, several times 10% each of the light transmitted through the previous plate are reflected again at the next.

By the arrangement according to the invention the error mentioned in the foregoing, which occurs on using one photo-electric cell only as receptor in consequence of the difference in the direction of the incidence of the two part-bundles in the arrangements of prior art, is avoided by the application of the principle of autocollimation whereby it is possible, by the adjustment of the two mirrors 3 and 4, to achieve that the directions of incidence of the two part-bundles are one and the same when they impinge on the receptor, i. e. on the cathode of the photo-electric cell 5.

In order to carry out measurements of the spectral reflection factors of substances it is merely necessary to arrange the reflecting sample in the measuring ray path instead of the mirror 3 and a comparison surface in the comparison ray path in place of the mirror 4.

We claim:

1. Photometric apparatus for determining the spectral transmission or reflection factor of a substance in the form of a solid, liquid or gas, by observing and measuring the radiation absorbing or reflection qualities characteristic of said substance, comprising a source of monochromatic radiation located in the back focal plane of an optical lens to provide parallel rays on the opposite side thereof, and means for dividing the beam of parallel rays of said source into two beams by reflecting part of the rays and by transmitting another part of the rays in directions at right angles to each other and to the direction of said incoming beam of parallel rays, said dividing means consisting of a thin planoparallel plate of light transmitting material the surfaces of which are uncoated whereby the reflection factors of the plate are the same on both sides, a first cell containing the substance under test located in the beam of reflected rays and another cell of identical material and length containing a comparison substance located in the beam of transmitted rays, two lens systems and two reflection surfaces the one said surface located in the back focal plane of the one said lens system in the beam of reflected rays beyond said first cell, and the other said surface located in the back focal plane of the other said lens system in the beam of transmitted rays beyond said second cell, each said surface reflecting one of said beams of parallel rays back along their original paths onto said dividing means, said dividing means serving as means for recombining both said reflected beams, and a further lens system in the path of recombined rays and a photoelectric means located in the back focal plane of said further lens system being responsive to the monochromatic radiation of said recombined beam, means for alternately and periodically interrupting said reflected and said transmitted partial rays before recombining them, said means being located each between said cells and said surfaces reflecting said partial beams, and means for measuring the intensity of the said photoelectric means.

2. In the photometric apparatus according to claim 1 said dividing means being of a material having an absorbtion for the monochromatic light as small as possible and having both its surfaces made equal as regards reflection of the radiation of said monochromatic source.

3. In the photometric apparatus according to claim 1 said dividing means consisting of a plurality of thin plano parallel plates of light transmitting material arranged with their reflecting sides in parallel relationship to each other in the path of rays.

References Cited in the file of this patent

UNITED STATES PATENTS

| 2,256,804 | Hurley | Sept. 23, 1941 |
| 2,503,165 | Meyer | Apr. 4, 1950 |
| 2,547,212 | Jamison et al. | Apr. 3, 1951 |

FOREIGN PATENTS

| 704,978 | Germany | Apr. 12, 1941 |